United States Patent
Narayanaswamy et al.

(10) Patent No.: US 12,506,622 B2
(45) Date of Patent: Dec. 23, 2025

(54) USING PROXY CERTIFICATES FOR OPERATING SECURELY BETWEEN USERS' CUSTOMERS AND CLOUD APPS

(71) Applicant: Netskope, Inc., Santa Clara, CA (US)

(72) Inventors: Krishna Narayanaswamy, Saratoga, CA (US); Siming Wu, Santa Clara, CA (US); Sridhar B. Venkatagowda, Mountain View, CA (US)

(73) Assignee: Netskope, Inc., Santa Clara, CA (US)

(*) Notice: Subject to any disclaimer, the term of this patent is extended or adjusted under 35 U.S.C. 154(b) by 0 days.

(21) Appl. No.: 18/634,924

(22) Filed: Apr. 13, 2024

(65) Prior Publication Data
US 2024/0348459 A1    Oct. 17, 2024

Related U.S. Application Data

(60) Provisional application No. 63/459,519, filed on Apr. 14, 2023.

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/3228* (2013.01)

(58) Field of Classification Search
CPC .... H04L 9/3265; H04L 9/0825; H04L 9/3228
USPC ........................................................ 713/158
See application file for complete search history.

(56) References Cited

U.S. PATENT DOCUMENTS

| | | |
|---|---|---|
| 2014/0259093 A1 | 9/2014 | Narayanaswamy et al. |
| 2018/0254896 A1 | 9/2018 | Moysi et al. |
| 2020/0050686 A1 | 2/2020 | Kamalapuram et al. |
| 2021/0176079 A1 | 6/2021 | Prince et al. |
| 2022/0116229 A1* | 4/2022 | Jones ................... H04L 9/0869 |
| 2022/0329442 A1* | 10/2022 | Bulusu ............... H04L 63/1416 |
| 2023/0239164 A1* | 7/2023 | Liu ....................... H04L 9/3236 |
| | | 713/157 |
| 2024/0073032 A1* | 2/2024 | Sterbling ................ G06F 21/57 |

FOREIGN PATENT DOCUMENTS

KR   2012-0041904 A   5/2012

OTHER PUBLICATIONS

Pechanec et al., "The PKCS #11 URI Scheme", Internet Engineering Task Force (IETF) Request for Comments: 7512, Category: Standards Track, Oracle Corporation, Apr. 2015, 20 pages.

Data Loss Prevention and Monitoring in the Cloud, Netskope, Inc., Nov. 2014, 18 pages.

(Continued)

*Primary Examiner* — Moeen Khan
(74) *Attorney, Agent, or Firm* — Haynes Beffel & Wolfeld LLP; Ernest J Beffel, Jr.; Jason Liao

(57) ABSTRACT

The disclosed technology teaches a method of operating an inspection proxy for encrypted sessions between users in an organization serviced by the inspection proxy and cloud-based services accessed by the users. The method comprises providing the inspection proxy comprising an intermediate certificate authority that holds a certificate authority (CA) certificate that browsers, operated by the users in the organization, recognize to be authorized to sign end-entity certificates, by virtue of being chained to a root certificate recognized by the browsers.

20 Claims, 11 Drawing Sheets

(56) References Cited

OTHER PUBLICATIONS

Repave the Cloud-Data Breach Collision Course, netSkope, Inc., 2014, 6 pgs.
The 5 Steps to Cloud Confidence, netSkope Inc., 2014, 11 pgs.
Netskope Cloud Confidence Index, netSkope, Inc., 2015, 4 pgs.
Netskope Active Cloud DLP, netSkope, Inc., 2015, 4 pgs.
Security Requirements for Cryptographic Modules, Information Technology Laboratory, Federal Information Processing Standards (FIPS) Publication 140-2, May 25, 2001, 69 pages.
Honeypots in Cybersecurity Explained, Cybersecurity 101, CrowdStrike, 2022, 9 pages, accessed at: https://www.crowdstrike.com/cybersecurity-101/honeypots-in-cybersecurity-explained/.
PCT/US2024/024528 International Search Report and Written Opinion dated Aug. 2, 2024, 9 pages.
Bruhner et al. "Changing of the Guards: Certificate and Public Key Management on the Internet". International Conference on Passive and Active Measurement. PAM 2022. Mar. 22, 2022, 32 pages.
Fortinet, "Fortinet Security Fabric Named 2016 CRN Network Security Product of the Year [press release]", Dec. 5, 2016, 4 pgs, available at https://www.fortinet.com/corporate/about-US/newsroom/press-releases/2016/fortinet-security-fabric-named-2016-crn-network-security-product.
Beck et al., "IBM and Cisco: Together for a World Class Data Center," IBM Redbooks, Jul. 2013, 654 pgs.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Niit, Special Edition Using Storage Area Networks, Que, 2002, 6 pgs.
Fortinet, FortiSandbox—Administration Guide, (Version 2.3.2), Nov. 9, 2016, 191 pgs.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Fortinet Inc., U.S. Appl. No. 62/503,252, "Building a Cooperative Security Fabric of Hierarchically Interconnected Network Security Devices." n.d., 87 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.

\* cited by examiner

USING PROXY CERTIFICATES FOR OPERATING SECURELY BETWEEN USERS' CUSTOMERS AND CLOUD APPS

CROSS-REFERENCE

This application claims the benefit of and priority to U.S. Provisional Application No. 63/459,519 titled "Using Proxy Certificates For Operating Securely Between Users' Customers And Cloud Apps," filed 14 Apr. 2023.

INCORPORATIONS

The following materials are incorporated by reference in this filing:
Federal Information Processing Standards (FIPS) Publication 140-2, "Security Requirements for Cryptographic Modules", issued May 25, 2001;
U.S. patent application Ser. No. 14/198,499, titled "Security for Network Delivered Services," filed Mar. 5, 2014, now U.S. Pat. No. 9,398,102 issued Jul. 19, 2016;
U.S. application Ser. No. 14/198,508, titled "Security for Network Delivered Services," filed Mar. 5, 2014, now U.S. Pat. No. 9,270,765, issued Feb. 23, 2016;
U.S. patent application Ser. No. 14/835,640, titled "Systems and Methods of Monitoring and Controlling Enterprise Information Stored on A Cloud Computing Service (CCS)," filed Aug. 25, 2015, now U.S. Pat. No. 9,928,377, issued Mar. 27, 2018;
U.S. application Ser. No. 15/368,240 titled "Systems and Methods of Enforcing Multi-Part Policies on Data-Deficient Transactions of Cloud Computing Services," filed Dec. 2, 2016, now U.S. Pat. No. 10,826,940, issued Nov. 3, 2020, which claims the benefit of U.S. Provisional Application 62/307,305 entitled "Systems and Methods of Enforcing Multi-Part Policies on Data-Deficient Transactions of Cloud Computing Services", filed Mar. 11, 2016;
U.S. patent application Ser. No. 15/368,246, titled "Middle Ware Security Layer for Cloud Computing Services," filed Dec. 2, 2016, now U.S. Pat. No. 11,019,101, issued May 25, 2021.
"Data Loss Prevention and Monitoring in the Cloud" by Netskope, Inc.;
"The 5 Steps to Cloud Confidence" by Netskope, Inc.;
"Netskope Active Cloud DLP" by Netskope, Inc.;
"Repave the Cloud-Data Breach Collision Course" by Netskope, Inc.; and
"Netskope Cloud Confidence Index™" by Netskope, Inc.

FIELD OF THE TECHNOLOGY DISCLOSED

The technology disclosed generally relates to cloud-based data security, and more specifically to operating as a proxy between a customer's user and cloud-based services, when encryption of a session is based on rooted certificates signed by a natively browser-recognized public key infrastructure (PKI) certificate authority.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud-based computing and the demand to be able to work from anywhere, anytime are two factors that are accelerating the push for comprehensive security access service edge systems that address the need for secure access to data from any device at any time and from any location.

Cybercriminals see the cloud as an effective method for subverting detection. Patterns of cyberthreats and malicious insiders change constantly. Meanwhile, sensitive data is increasingly distributed and moving to applications that are not necessarily sanctioned or properly secured. Security policies often need to be evaluated for individual users in real time, for example, when users are uploading and downloading files, browsing websites, or accessing data in the cloud. Millions of critical decisions impacting user experience need to be made daily.

Existing network security architectures were designed with the enterprise data center as the focal point for access needs. Meanwhile, IT architectures like cloud and edge computing and work-from-anywhere capability result in more users, devices, applications, services, and data located outside of an enterprise than inside.

Few industries have changed as dramatically as financial services (FINSERV) in recent years. The vast majority of financial affairs today are managed digitally. Behind the scenes, banks, credit unions, insurance firms, mortgage companies, and others are working to transform their infrastructure in order to enhance security and operate more effectively. Technologies that are engineered to support cloud-based systems are the future of networking and security for improved isolation of secure data.

An opportunity arises for operating an inspection proxy for encrypted sessions between users in an organization serviced by the inspection proxy and cloud-based services accessed by the users. Accordingly, an opportunity also emerges for a proxy intercepting traffic from the customer's user and a cloud-based service for improved risk detection.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
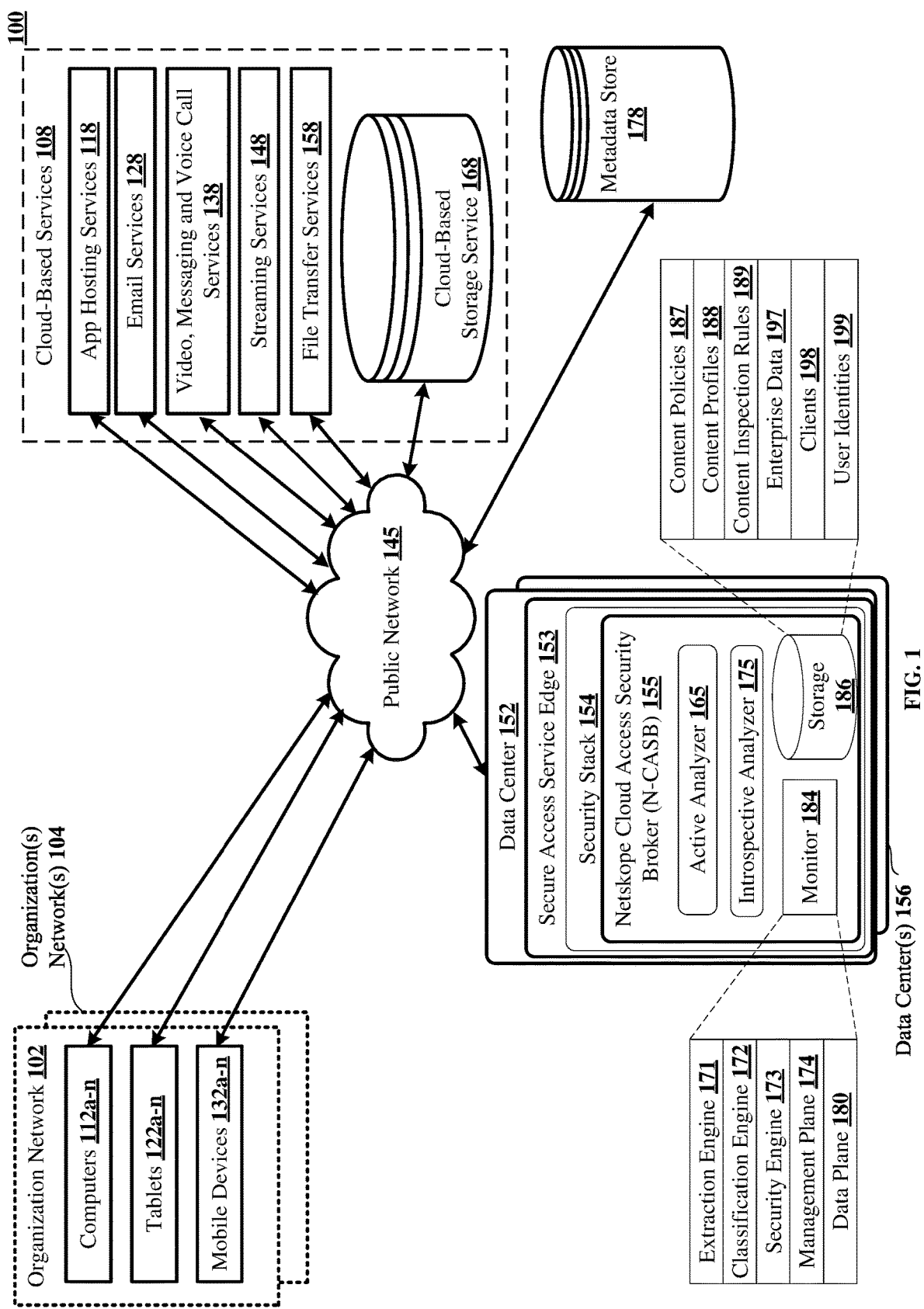
FIG. 1 illustrates an architectural level schematic of a system for providing a proxy intermediate certificate authority, in accordance with an implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Banks, credit unions, insurance firms, mortgage companies, and others utilize TLS/SSL certificates in digital banking to protect customers' assets. Browsers utilize a trusted set of certificate authorities. In one example when no proxy is in use for bankamerica.com communication from a browser, bankamerica.com would return an X.509 certificate signed by a trusted authority. The X.509 certificate binds an identity to a public key using a digital signature. The certificate contains an identity (a hostname, an organization, or an individual) and a public key (RSA, digital signature algorithm (DSA), ECDSA, ed25519, etc.), and is either signed by a certificate authority (CA) or is self-signed. When a certificate is signed by a trusted CA, or validated by other means, someone holding that certificate can use the public key it contains to establish secure communications with another party, or validate documents digitally signed by the corresponding private key.

As financial affairs today are managed digitally, financial technology and others are utilizing network security providers to protect customers' data from the myriad security risks. Network security providers utilize a proxy. The browser maps to a proxy and the proxy maps to the application. In this scenario, the proxy creates their own CA and inserts the trusted CA into the browser's trusted CA list. Then, in a parallel example, when users go to bankamerica.com, the proxy CA signs a certificate certifying they are bankamerica.com, to establish trust.

Customers are concerned about the protection of CAs used for signing the certificates. Before a proxy can intercept a TLS/SSL connection, the intercepting proxy must make the client believe that they are trusted. Next, we summarize aspects of the TLS/SSL security protocol.

Transport layer security (TLS), (evolved from secure sockets layer (SSL)), is an encryption-based Internet security protocol that encrypts data that is transmitted across the web, for communication between web applications and servers, such as web browsers loading a website. TLS/SSL initiates an authentication handshake between two communicating devices to ensure that both devices are really who they claim to be. TLS/SSL also digitally signs data in order to provide data integrity, verifying that the data is not tampered with before reaching its intended recipient.

For a website or application to use TLS, it must have a TLS certificate installed on its origin server, for fulfilling the functions of authentication and data encryption. First, the certificate can assist with authenticating and verifying the identity of a host or site. The TLS certificate has information about the authenticity of details around the identity of a host or site. So, when one clicks on the padlock displayed or checks the trust mark, the certificate chain details prove where the certificate is generated from. Second, the certificate enables the encryption of information exchanged via a website. When data in transit is encrypted, the sensitive information exchanged via the website cannot be intercepted and read by anyone other than the intended recipient.

A certificate authority (CA), also referred to herein as a master CA, such as DigiCert (which is one of a hundred different certificate authorities) is an entity that issues digital certificates. A CA issues a TLS certificate to the person or business that owns a domain. The certificate contains important information about who owns the domain, along with the server's public key, both of which are important for validating the server's identity. TLS/SSL certificates are most reliable when issued by a trusted CA which follows stringent rules and policies about who may or may not receive a TLS/SSL Certificate. So, when one has a valid TLS/SSL Certificate from a trusted CA, there is a higher degree of trust. A digital certificate certifies the ownership of a public key by the named subject of the certificate. When a CA signs a TLS/SSL certificate or another entity validates them, the owner of that certificate can leverage the public key to establish secure connections with another party or validate documents someone digitally signed using the corresponding private key.

Network proxies for SSL connections must be able to decrypt and inspect traffic. To be able to inspect traffic within an SSL connection, the proxy has to impersonate the server so that a user's browser will accept that the proxy certificate is valid (i.e., signed by a hierarchy that is trusted by the endpoint). The disclosed solution provides on behalf of the customer a proxy intermediate certificate authority that holds a CA certificate that is authorized (by the customer's intermediate CA authority) to sign subordinate certificates and that is chained to a certificate approved by the customer as a root certificate. In one implementation, for an organization in which organizational browsers are used by users in the organization, the organization has an organization CA responsible for generating an organization CA certificate as the root certificate to which intermediate CA certificates can be chained. In another implementation, the organization browsers are configured to trust an entity CA certificate generated by an entity distinct from and not controlled by the organization. The entity operates the inspection proxy for encrypted sessions, established by the inspection proxy, and the root certificate in this implementation is the entity CA certificate. The proxy intermediate certificate authority also holds a private key used to sign the subordinate certificates.

Distribution of a private key is an untenable risk for data security in general, and very much so for financial technology (FinTech) delivery of financial services. The public key is public. Existing network security services keep the private key in the proxy so they can perform decryption of data. If the private key is compromised, anyone can masquerade as the customer, such as salesforce.com or Google.com, and compromise security because the CA is signed by a trusted private key.

Additionally, existing data security solutions utilize data centers and multiple proxies per data center. In one example, fifty data centers each have eight to ten proxies, resulting in as many as five hundred proxies in the system, and each proxy creates its own CA. In one implementation, a data center is even physically located in Hong Kong, which is a special administrative region of China.

Existing digital banking security protocols use long-lived CAs that remain valid for up to three years, which introduces a long-term vulnerability in a scenario in which the CA gets compromised.

The disclosed solution utilizes a short-lived certificate signing request (CSR) that is active for a very short period of time, such as one week. Also in the disclosed solution, the private key needed to sign the CSR is stored only in a hardware security module (HSM), so it does not traverse the "network boundary" (secured hardware boundary). If information leaves the confines of the HSM processing unit to another processing unit, then it traverses the boundary. Even with an HSM, potential insider security threats exist.

The technology disclosed solves the technical problem of operating an inspection proxy for encrypted sessions between users in an organization serviced by the inspection proxy and cloud-based services accessed by the users. An example system for providing an inspection proxy comprising an intermediate certificate authority that holds a certificate authority (CA) certificate that browsers, operated by the users in the organization, recognize to be authorized to sign end-entity certificates is described below.

Herein, the organization may also be referred to as a tenant. The browsers, operated by users, may be referred to by the browsers themselves as organization browsers, tenant browsers, or browsers, or referred to by the users as either users or clients. Throughout the description of the figures, certain terms are synonymously interchanged in view of specific contexts to improve clarity of the discussion. Nonetheless, it is to be understood that the technology disclosed generally refers to an entity (distinct from and not controlled by an organization) operating at least one inspection proxy between organization browsers and clients (i.e., users) and cloud-based resources, wherein the organization browsers are used by users in the organization and the organization has an organization CA.

Architecture

FIG. 1 shows an architectural level schematic of a system 100 for providing a proxy intermediate certificate authority. System 100 also includes functionality for interoperating with single sign-on (SSO) solutions and/or corporate identity directories. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes organization network 102, data center 152 with secure access service edge (SASE) system 153 with security stack 154, Netskope cloud access security broker (N-CASB) 155 and cloud-based services 108. SASE system 153 comprises the amalgamation of network security functions N-CASB 155, as well as secure web gateway (SWG), zero trust network access (ZTNA), virtual private network (VPN), and software-defined wide area networking (SD-WAN) capabilities (omitted to improve clarity). Organization network 102 includes computers 112*a-n*, tablets 122*a-n* and mobile devices 132*a-n*. System 100 includes multiple organization networks 104 for multiple subscribers, also referred to as multi-tenant networks, of a security services provider and multiple data centers 156. In another organization network, organization users may utilize additional devices. Cloud services 108 includes cloud-based app hosting services 118, web email services 128, video, messaging and voice call services 138, streaming services 148, file transfer services 158, and cloud-based storage service 168. Data center 152 connects to organization network 102 and cloud-based services 108 via public network 145. Netskope cloud access security broker (N-CASB) 155, between cloud service consumers and cloud service providers, combines and interjects enterprise security policies as cloud-based resources are accessed.

Continuing the description of FIG. 1, each security layer of security stack 154 can detect issues. Enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246.

Continuing further with the description of FIG. 1, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or corporate identity directory but is distinct from it. In one implementation, a cryptographic certificate signed by the network security is used as the user identity. In other implementations, the user identity can be solely unique to the user and be identical across devices.

Further describing system 100 of FIG. 1, embodiments can also interoperate with single sign-on (SSO) solutions and/or corporate identity directories, e.g., Microsoft's Active Directory (AD). Such embodiments may allow policies to be defined in the directory, e.g., either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g., a dedicated account held by the system that holds the only credentials to sign in to the service. In other embodiments, the client may encrypt the sign-on credentials before passing the login to the hosted service, meaning that the networking security system "owns" the password.

Storage 186, displayed in FIG. 1, can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Object Notation), BSON (Binary JSON), XML, Protobuf, Avro or Thrift object, which consists of string fields (or columns) and corresponding values of potentially different types like numbers, strings, arrays, objects, etc. JSON objects can be nested, and the fields can be multi-valued, e.g., arrays, nested arrays, etc., in other implementations. These JSON objects are stored in a schema-less or NoSQL key-value metadata store 178 like Apache Cassandra™, Google's Bigtable™, HBase™, Voldemort™, CouchDB™, MongoDB™, Redis™, Riak™ Neo4j™, etc., which stores the parsed JSON objects using key spaces that are equivalent to a database in SQL. Each key space is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1, system 100 can include any number of cloud-based services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VOLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™ Amazon AWS™, Microsoft Office 365™, Workday™, Oracle on Demand™, Taleo™, Yammer™, Jive™, and Concur™.

In the interconnection of the elements of system 100, network 145 couples computers 112a-n, tablets 122a-n and mobile devices 132a-n, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used, and one or more points of presence (POPs) can be established to implement the security functions. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs are hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112a-n, tablets 122a-n and mobile devices 132a-n in organization network 102.

Computers 112a-n, tablets 122a-n and mobile devices 132a-n in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g., a corporate identities directory such as a Microsoft Active Directory (AD) or an implementation of open Lightweight Directory Access Protocol (LDAP) pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g., read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246; Cheng, Ithal, Narayanaswamy and Malmskog Cloud Security For Dummies, Netskope Special Edition, John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance and/or security. In one implementation, the data plane is on-premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer-readable medium such as a computer-readable storage medium that stores computer-readable instructions or computer program code, or as a computer program product comprising a computer usable medium having a computer readable program code embodied therein. The technology disclosed can be implemented in the context of any computer-implemented system, including a database system or a relational database implementation like an Oracle™ compatible database implementation, an IBM DB2 Enterprise Server™ compatible relational database implementation, a MySQL™ or PostgreSQL™ compatible relational database implementation, or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

Figure 2:
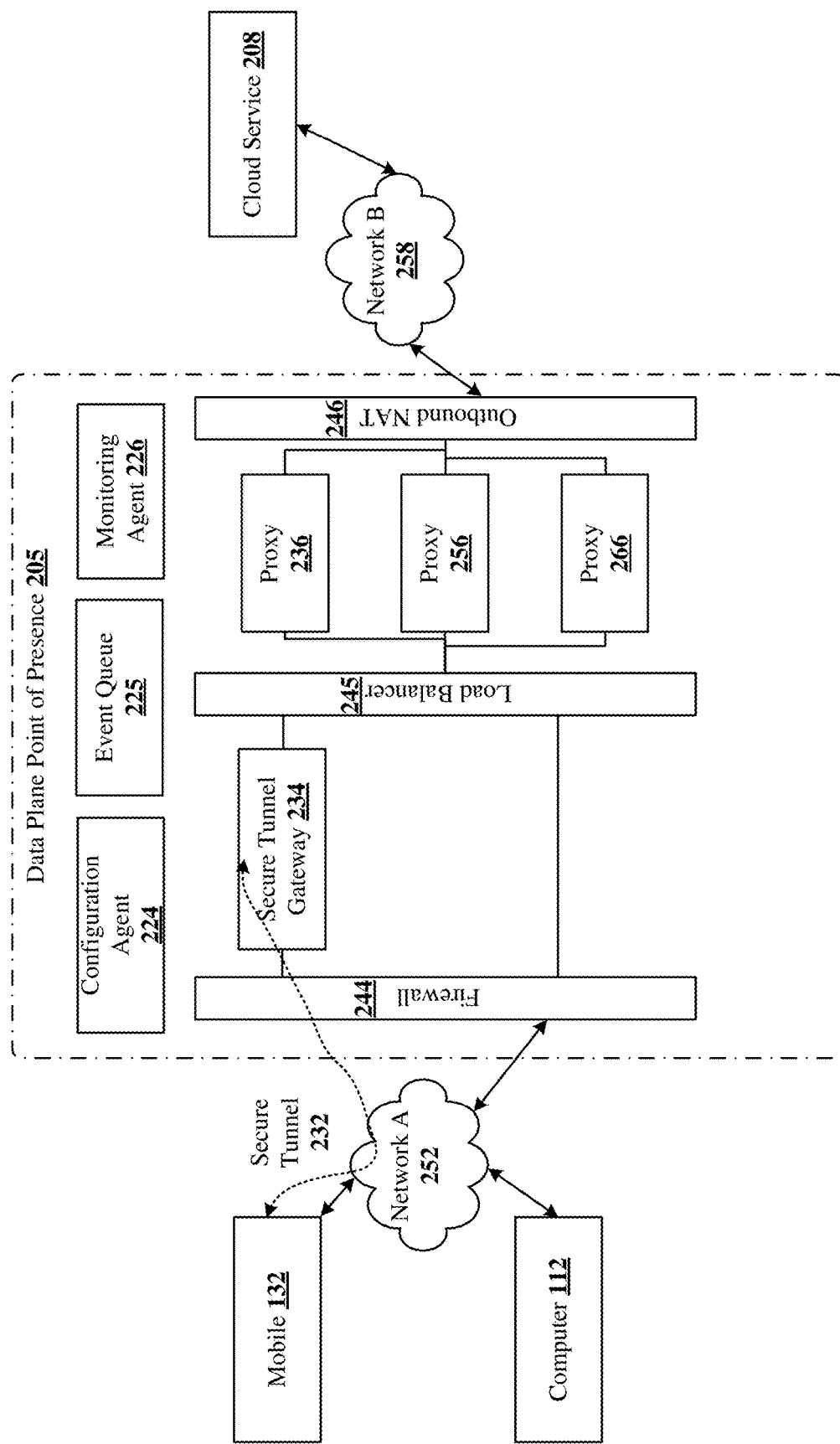
FIG. 2 shows an architectural level schematic of a data plane point of presence (POP).

FIG. 2 shows an architectural level schematic of a data plane point of presence (POP). FIG. 2 includes a data plane point of presence 205 (dashed-dotted box) connected to network A 252 and network B 258. These can be the same or different networks. Network A 252 is also connected to client devices such as mobile 132 and computer 112. Network B 258 is connected to the cloud service 208. The data plane functionality is implemented according to one implementation with multiple computers, storage, and networking gear across multiple POPs such as data plane POP 205. The elements of data plane POP 205 include a firewall 244, a secure tunnel gateway 234, a load balancer 245, multiple proxies 236, 256, and 266 (each inspection proxy implements the policies according to the current configuration), and an outbound network address translation element-NAT 246. The architecture can be further scaled, e.g., multiple firewalls, etc. The inspection proxies 236, 256 and 266 implement the specific policy, e.g., drop, reset, redirect, requests (or entire flows), as well as generate the logging messages. The terms "proxy" and "inspection proxy" are used interchangeably in this document and should be considered as such.

The data plane POP 205 also includes a configuration agent 224 for receiving configuration and policy information from the management plane, an event queue 225 for recording and/or storing events to be sent to the management plane, and a monitoring agent 226 for monitoring the performance and status of the data plane POP 205. These items are generally coupled in communication with one or more management plane POPs, e.g., management plane POP 305 of FIG. 3 described below, as well as the other elements of the data plane (not shown in order to focus on the data flow). Similarly, the configuration systems are not shown here. The difference between configuration and policy is that configuration information is information provided by the operator of the network security system, e.g., how many data plane POPs to have active, what version of the inspection proxy software to load, etc., while policy information is provided by administrative users of the system, e.g., corporate IT personnel.

Also shown in FIG. 2 is an example of the secure tunnel 232 used by mobile 132 and other mobile clients. In contrast, the data from computer 112 is routed directly from the firewall 244 to the load balancer 245. Some client types use secure tunnels (here one is being used for mobile) and others do not (here one without a secure tunnel is being used for the computer).

Figure 3:
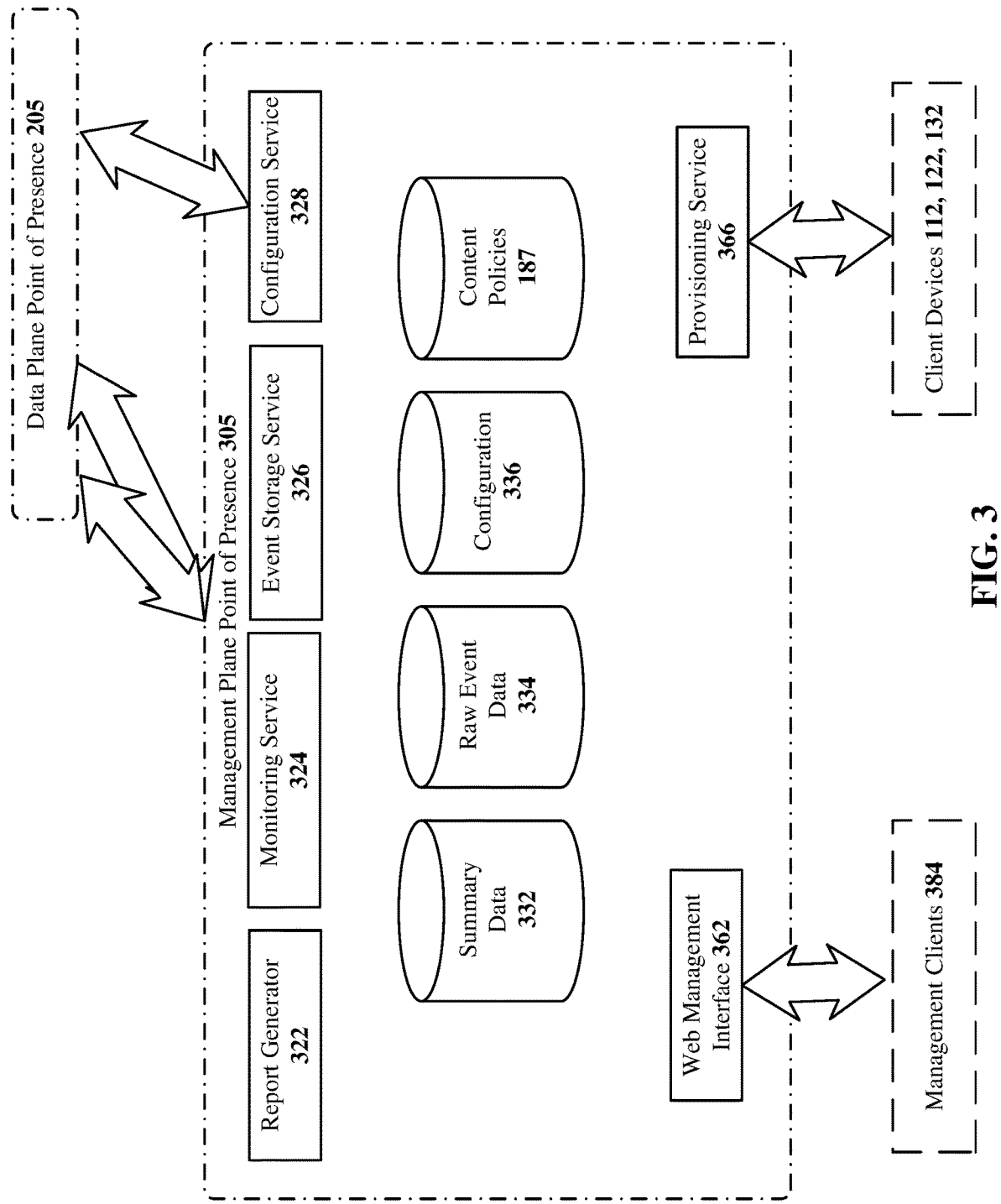
FIG. 3 shows an architectural level schematic of a management plane point of presence (POP).

FIG. 3 shows an architectural level schematic of a management plane point of presence (POP). FIG. 3 includes a management plane POP 305 to implement the management plane functionality. Some implementations may have only a single management plane POP, while others may have multiple POPs. The inter-relationship and communications with the data plane POP 205 are shown in FIG. 3 with large double-headed arrows. The communications between management clients 384 and the client devices 112, 122, 132 and the management plane POP 305 are similarly represented.

Management plane POP 305 includes: summary data 332, raw event data 334, configuration 336, policies 187, web management interface 362, provisioning service 366, configuration service 328, event storage service 326, monitoring service 324, and report generator 322. The services bridge the management/data planes: configuration service 328 communicates with configuration agent 224; event storage service 326 communicates with event queue 225; monitoring service 324 communicates with configuration agent 224. The report generator 322 is a management-plane-only item in this implementation, combing the raw event data 334 to generate summary data 332 for reporting. The web management interface 362 enables administration and reporting via web browsers. The provisioning service 366 provides client devices with the appropriate client, for configuration. The provisioning service 366 may also be responsible for providing policy updates to client devices 112, 122, 132. In other implementations, event storage service 326 and/or monitoring service 324 may accept data directly from cloud services and/or other sources for unified logging and reporting.

While data plane point of presence 205 and management plane point of presence 305 are described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Figure 4:
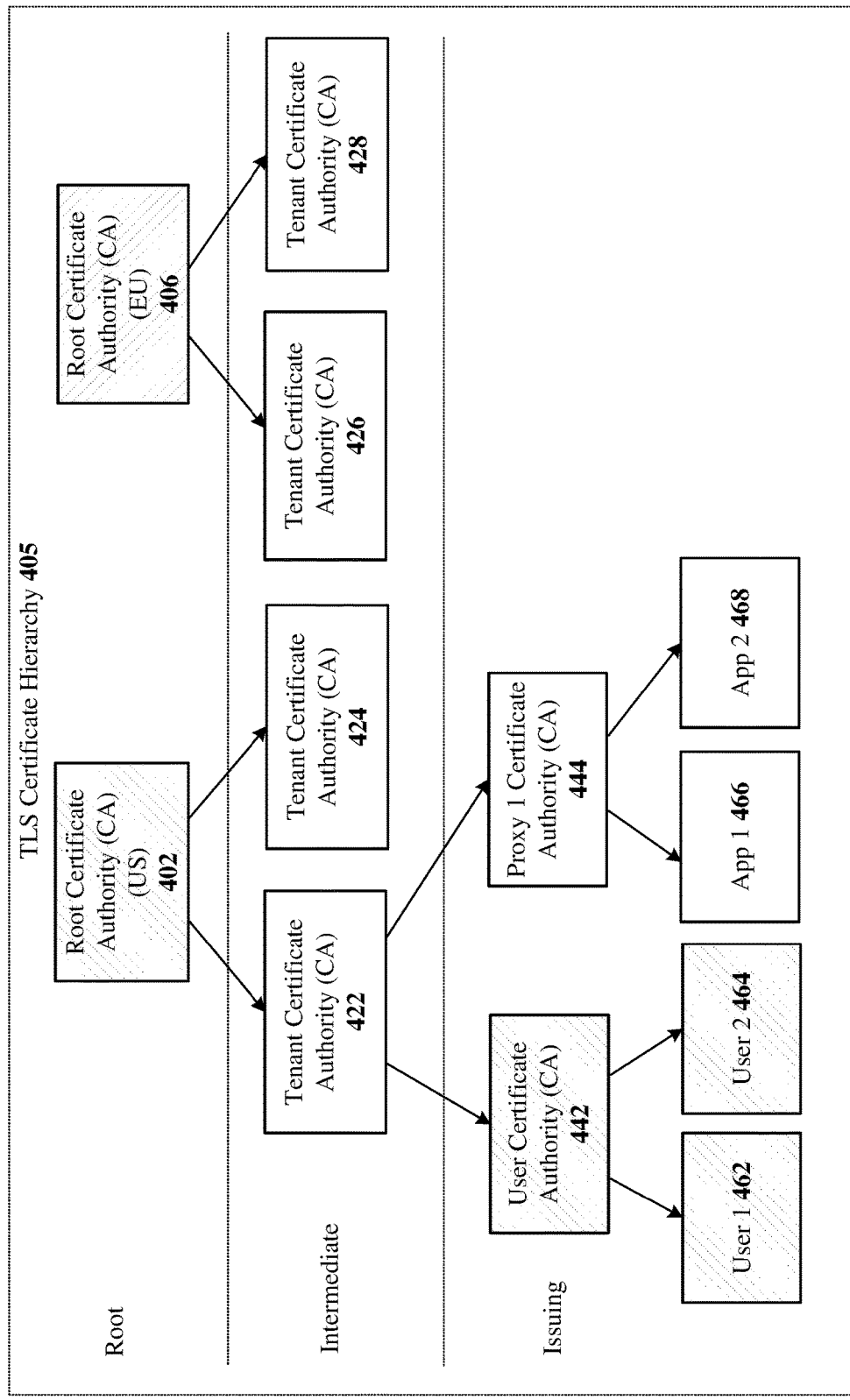
FIG. 4 illustrates an example TLS certificate hierarchy, with regional lines of separation for US and EU.

FIG. 4 illustrates an example TLS certificate hierarchy 400 with regional lines of separation for the US 402 and EU 406. The public key infrastructure (PKI) is the set of roles, policies, hardware, software and procedures needed to create, manage, distribute, use, store and revoke digital certificates and manage public-key encryption. The PKI certificate authority creates the CA digital certificates. The trust anchor for the digital certificate is the organization certificate authority 402, 406. Multiple intermediate CAs branch from these organization CAs, in a parent-child relationship rooted to the organization CA. The organization CA can be kept in a secure HSM, as described below. Child CAs get certified by the corresponding parent CA back to the organization CA. Intermediate organization or tenant certificate authorities 422, 424, 426, 428 are intermediate CA, subordinate to the organization CA. They can provide certificates to users, to computers, and to other services issuing certificates to other CAs in the CA hierarchy. In the example TLS certificate hierarchy 400, intermediate certificate authority 422 issues user certificate authority 442, which in turn issues a CA to user 1 462 and a CA to user 2 464. Additional levels of hierarchy may be utilized in another implementation, such as for Federal government security.

The intermediate CA private key is very sensitive. In prior art scenarios, the private key of the intermediate CA traverses a private network to sign app certificates. In an example with 50 data centers distributed around the world, each with eight to ten proxies, the private key traverses a private network to each of the proxies. FinTech customers find this unacceptable. Also, a typical current time validity for a certificate is three years, which is long enough for a compromised certificate to be used to exploit a customer's data.

The disclosed technology creates an intermediate proxy to avoid private keys traversing a network boundary. The new intermediate proxy generates a proxy certificate with a configurable validity time. For the disclosed hierarchy, intermediate certificate authority 422 issues proxy 1 CA 444, which in turn issues a CA to app 1 466 and a CA to app 2 468. The intermediate proxy dynamically generates proxy 1 CA 444 which is configurable to be short-lived, such as described in the example as on the order of one week. The certificates can be revoked if they are compromised.

Interactions Between the Management Plane and Data Plane

Figure 5:
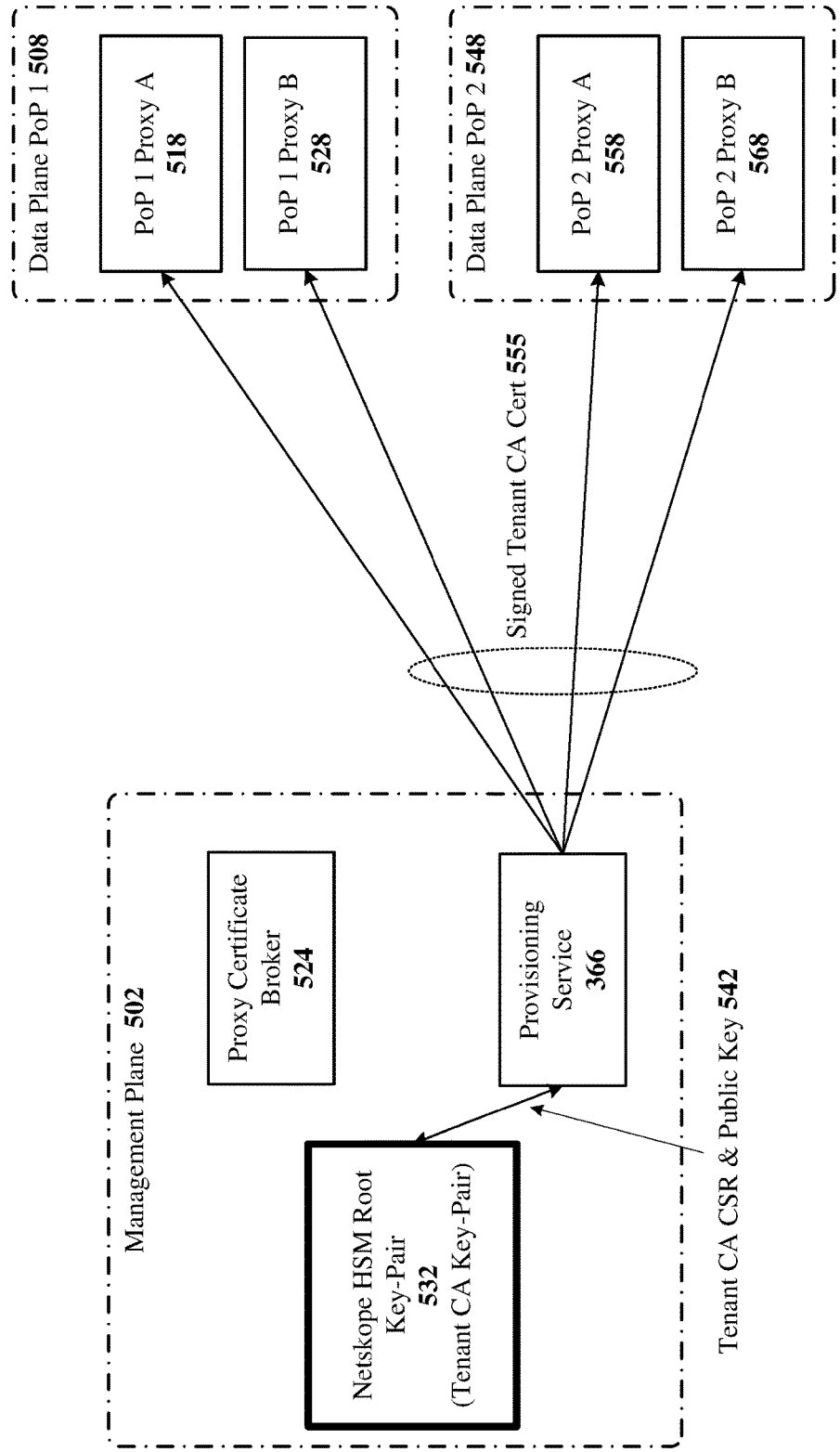
FIG. 5 illustrates a high-level block diagram of interactions between the management plane and data plane points of presence (POP).

FIG. 5 illustrates a high-level block diagram 500 of interactions between the management plane and data plane points of presence (POP) for a disclosed system in which every inspection proxy creates its own CA with a private key and a public key. Management plane 502 functions as a key management server, with Netskope hardware security module (HSM) 532 which holds organization certificate authority (CA) 402, 406. Management plane 502 also has proxy certificate broker 524 and provisioning service 366. Data plane PoP 1 508 has PoP 1 proxy A 518 and POP 1 proxy B 528, and data plane PoP 2 548 has POP 2 proxy A 558 and PoP 2 proxy B 568.

HSM 532 is a tamper-proof physical computing device that safeguards and manages the digital keys and can perform encryption and decryption functions for digital signatures, strong authentication and other cryptographic functions. HSM 532 holds the organization CA private key and the intermediate CA private keys. HSM 532 processes a single operation per tenant from provisioning service 366.

Continuing the description of FIG. 5, when a new tenant is created, provisioning service 366 generates an intermediate CA key pair and sends a certificate signing request (CSR) 542, with a configurable validity time, and the intermediate CA key-pair to HSM 532 for signature. The CSR or a derivative of the CSR is signed in HSM 532. Then provisioning service 366 sends the public key and the signed intermediate CA certificate 555 to each of the four PoP proxies: PoP 1 proxy A 518, POP 1 proxy B 528, POP 2 proxy A 558 and POP 2 proxy B 568. For an example implementation with fifty data centers, with eight to ten proxies per data center, provisioning service 366 would send the public key and signed intermediate CA certificate to each of the hundreds of proxies that constitute the full set of inspection proxies. Each inspection proxy then creates its own public-private key-pair in memory, as described next. That is, inspection every proxy will have its own private key (NOT the same private key that is stored in the HSM). Using this disclosed technology, one private key being compromised would only compromise a subset of the traffic.

Figure 6:
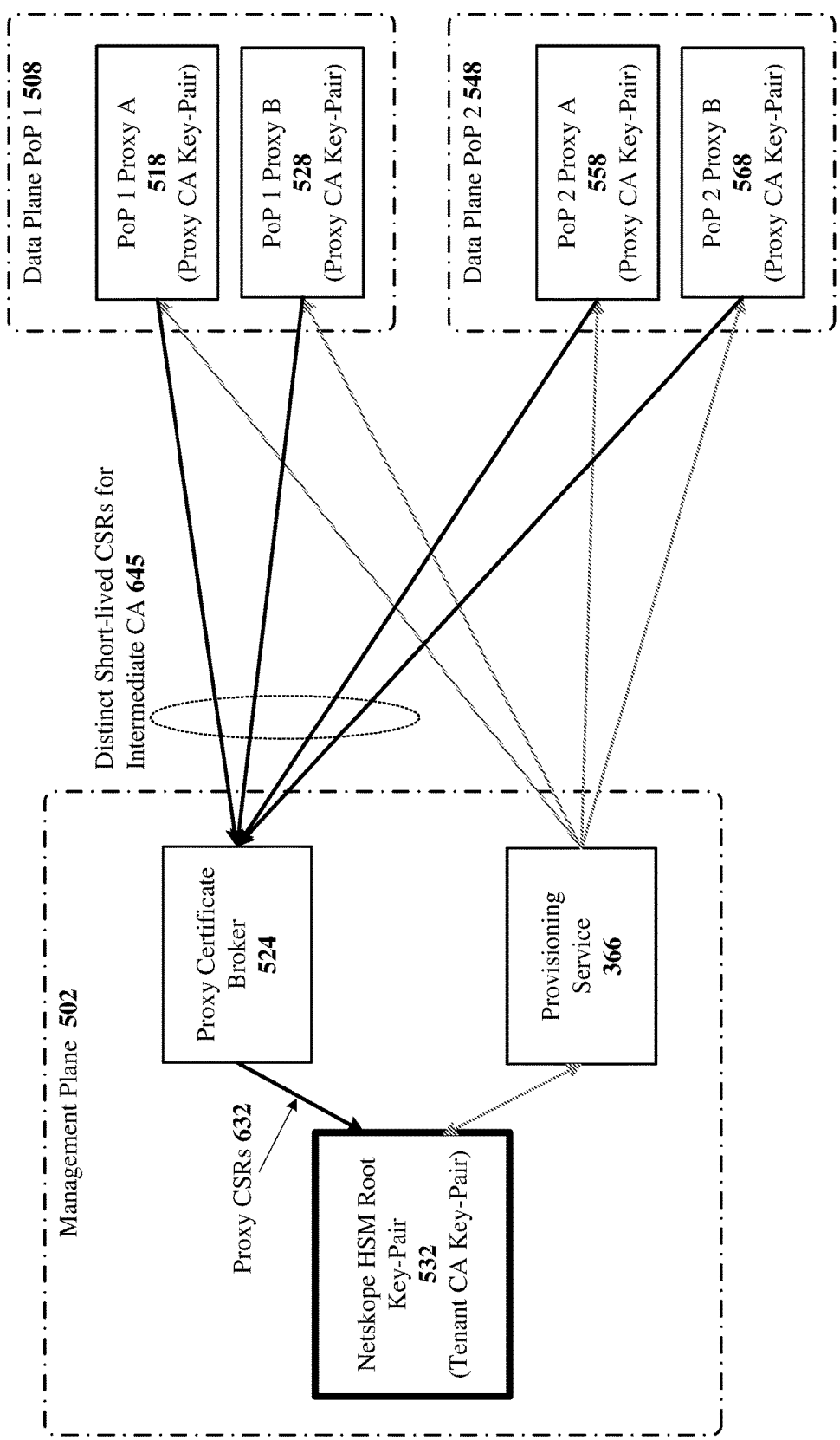
FIG. 6 illustrates each proxy storing an intermediate CA key-pair in proxy memory.

FIG. 6 illustrates inspection proxies storing a domain-specific CA key-pair in proxy memory. The key-pair of each proxy 518, 528, 558, 568 needs to be signed by a trusted authority. Each proxy 518, 528, 558, 568 sends a distinct short-lived CSR for domain-specific CA 645 to proxy certificate broker 524. In one example, the configurable validity time can be one week. In another case, the validity time could be configured for a day, a month, or a year, or another amount of time in ranges bounded by a day, week, month or year.

Continuing the description, the private key stored in HSM 532 is needed to sign the distinct short-lived CSR for each of the proxies, and the private key stays inside the HSM 532, inside the cryptographic boundary of the physical memory of the HSM processing unit. Using the disclosed technology, proxy certificate broker 524 sends the proxy CSRs 632 to HSM 532 for signing. HSM 532 sends the signed certificates back to the proxies for use by the proxies to access applications securely, such as for obtaining the Salesforce certificate, a Box certificate, etc. A few hours or a day before the signed certificate expires, the same process is used to obtain a new short-lived certificate. That is, the proxies each generate a new public key private key pair and generate CSRs which the proxies send to the proxy certificate broker. The proxy certificate broker sends the CSRs to the HSM for signing and sends the signed certificates with new public keys back to the proxies for use for the next week. Therefore, the amount of time of validity of any key-pair is very short.

The Key Management Interoperability Protocol (KMIP) is an extensible communication protocol that defines message formats for the manipulation of cryptographic keys on a key management server. This facilitates data encryption by simplifying encryption key management.

Figure 7:
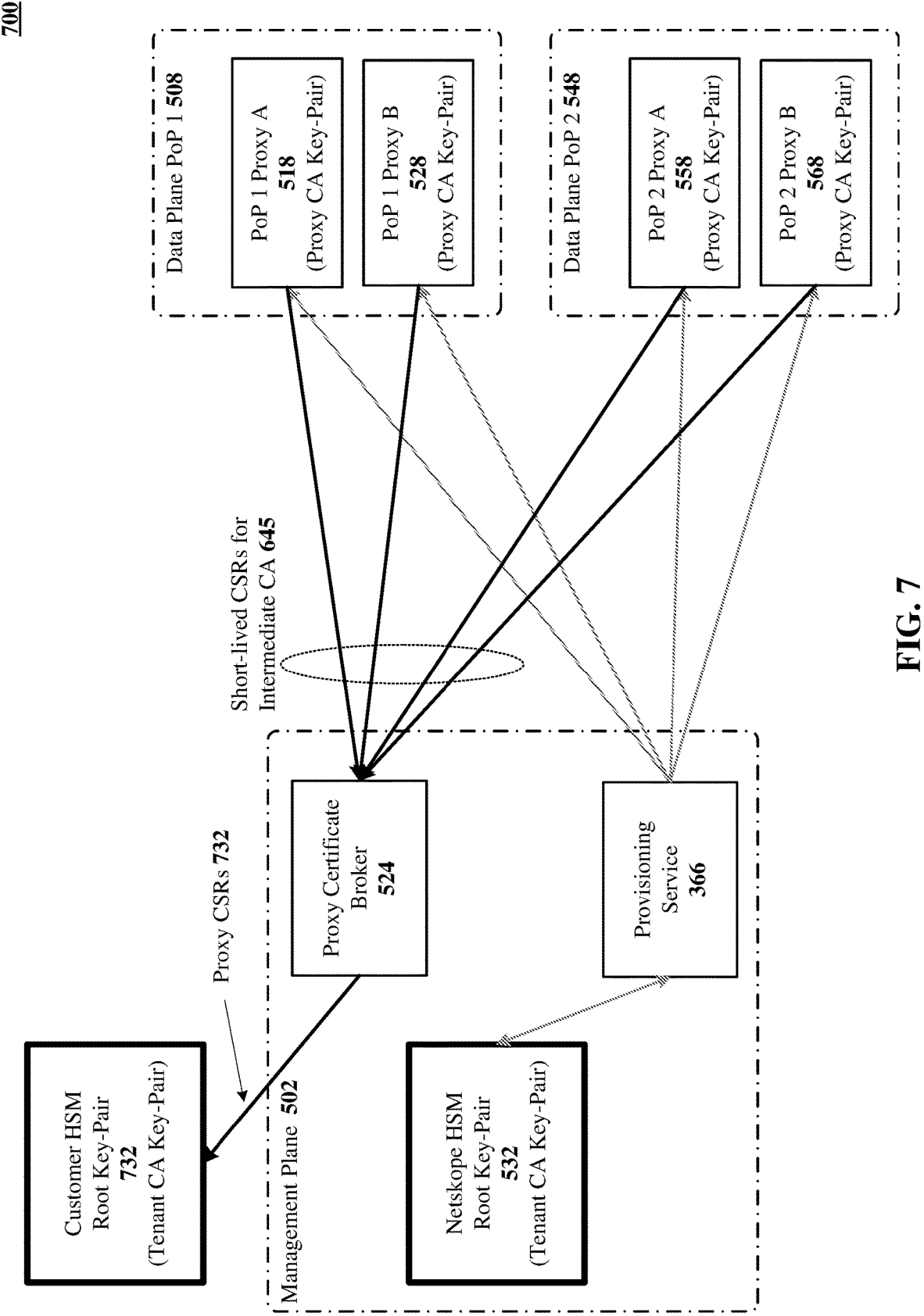
FIG. 7 illustrates proxy certificate signing requests (CSRs) being sent to a customer hardware security module (HSM).

FIG. 7 illustrates proxy certificate signing requests (CSRs) being sent to a customer hardware security module (HSM). As in system 600, the key-pairs of proxies 518, 528, 558, 568 are signed by a trusted authority in system 700. Each proxy 518, 528, 558, 568 sends a distinct short-lived CSR for domain-specific CA 645 to proxy certificate broker 524. In one example, the configurable validity time can be one week. In another case, the validity time could be configured for a month, or a year, or another amount of time or range spanning those durations. In addition to Netskope HSM 532, the implementation shown in system 700 also comprises a separate Customer HSM 732 capable of storing the Tenant CA key-pair. The described implementation refers to the process illustrated with black lines, in addition to the prior described implementation of system 600 illustrated with grey lines.

Continuing with the description of system 700, a private key stored in HSM 732 is used to sign the distinct short-lived CSR for each of the proxies, and the private key stays inside the HSM 732, inside the cryptographic boundary of the physical memory of the HSM processing unit. In one example of the disclosed technology, proxy certificate broker 524 sends the proxy CSRs 632 to HSM 732 for signing. HSM 732 sends the signed certificates back to the proxies for use by the proxies to access applications securely.

Figure 8:
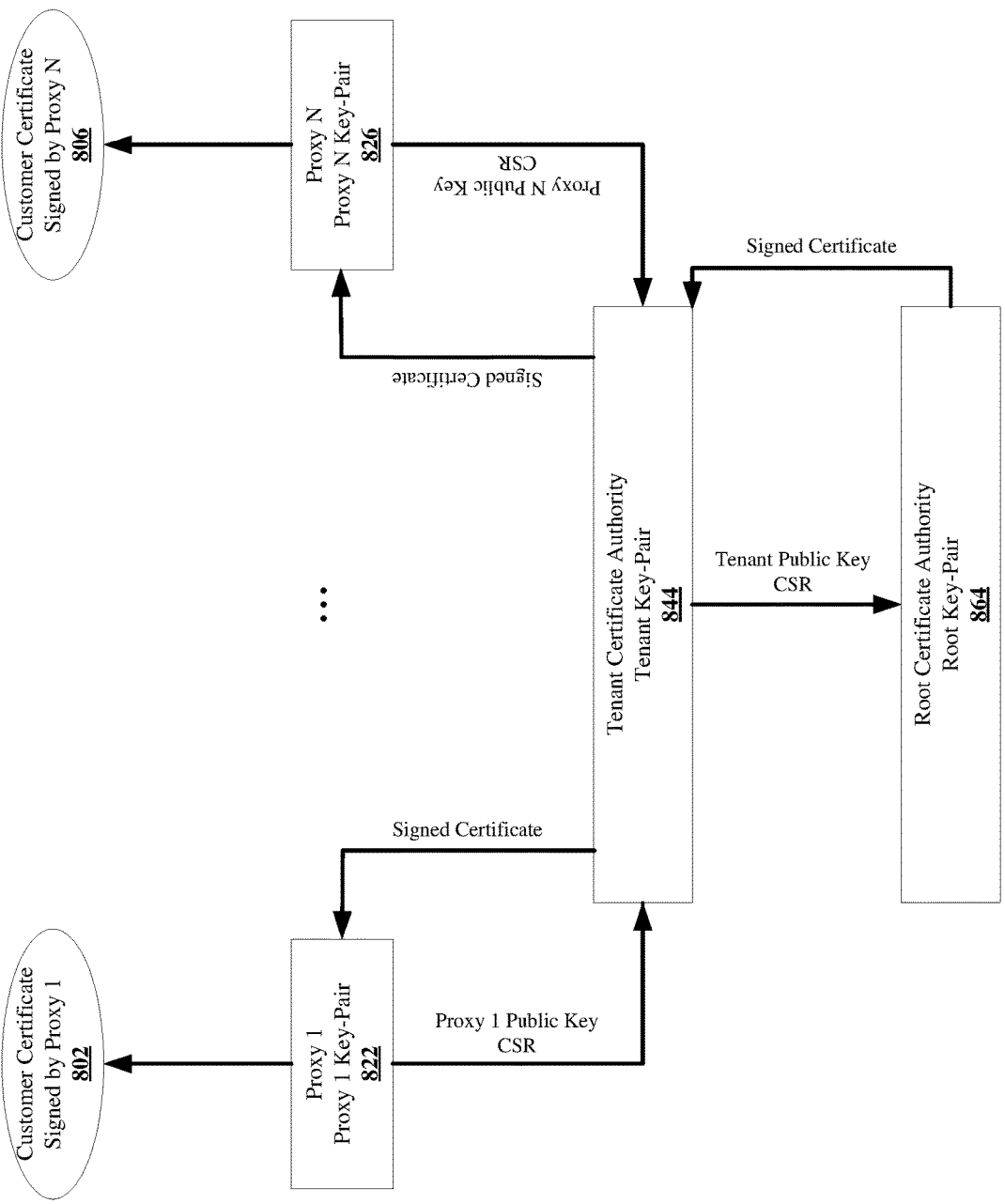
FIG. 8 is a schematic diagram of a method for the signing of a customer certificate by an example TLS certificate hierarchy, including a proxy.

FIG. 8 is a schematic diagram of a method for the signing of a customer certificate by an example TLS certificate hierarchy, including a proxy. FIG. 8 comprises a first customer certificate 802 through an $N^{th}$ customer certificate 806. Customer certificate 1 802 has been signed by proxy 1 822, wherein proxy 1 822 comprises its own key-pair. Customer certificate 2 802 has been signed by proxy 2 826, wherein proxy 2 826 also comprises its own key-pair. Both proxy 1 822 and proxy 2 826 send respective CSRs (along with respective proxy public keys) to a tenant certificate authority 844, comprising its own key-pair. The trust anchor for the digital certificate is the root certificate authority 864 (i.e., an organization certificate authority), to which intermediate certificate authority 844 sends a CSR (along with the tenant public key). The organization CA is kept in a secure HSM, as described above. In return, the organization certificate sends the signed certificate. This chain follows the same description and implementation as seen in FIG. 4, with proxy CAs for apps in place of intermediate CAs.

Illustrative Certificate Path

Figure 9:
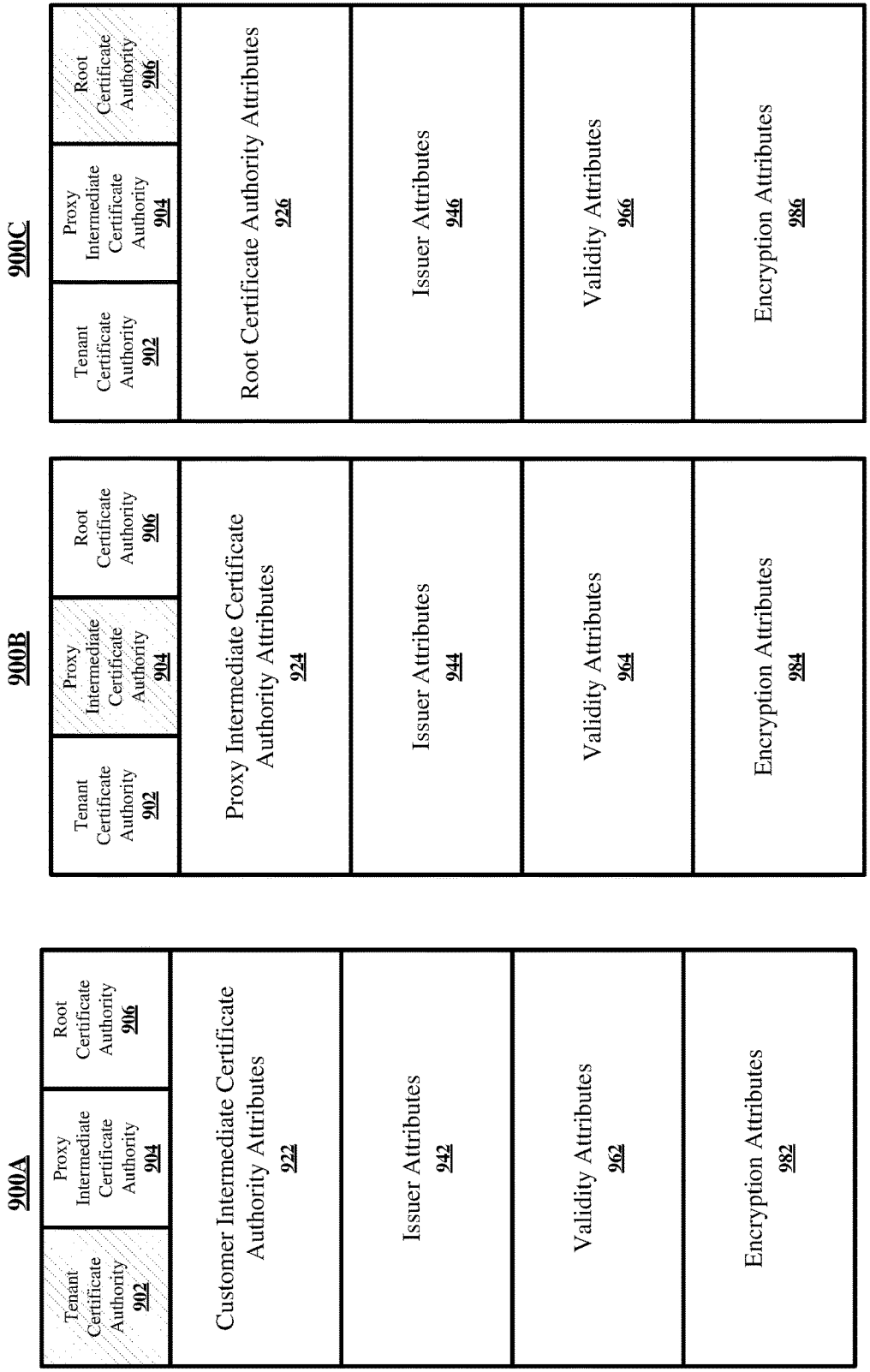
FIG. 9 illustrates an example certificate for a cloud-based service.

FIG. 9 illustrates an example certificate for a cloud-based service. For a particular cloud-based service, the TLS certificate chain may comprise a tenant certificate authority 844 (i.e., an intermediate certificate authority), proxy 1 822 (i.e., a proxy domain-specific certificate authority), and a root certificate authority 864. Certificate 900A, respective to intermediate certificate authority 844 and signed by root certificate authority 864, comprises intermediate certificate authority attributes 922 (identity data such as a hostname, or an organization, or an individual), issuer attributes (whether the certificate is signed by a CA or self-signed) time validity attributes 962 (date and times of certificate issuance and expiration), and encryption attributes 982 (public key, key agreement protocol, et cetera). Additionally, certificate 900B, respective to proxy intermediate certificate authority 822 and signed by tenant certificate authority 844, comprises intermediate certificate authority attributes 924 (identity data such as a hostname, or an entity, or an individual), issuer attributes (whether the certificate is signed by a master CA or self-signed) time validity attributes 964 (date and times of certificate issuance and expiration), and encryption attributes 984 (public key, key agreement protocol, et cetera). Finally, certificate 900C, respective to the root certificate authority 864 and self-signed, comprises customer intermediate certificate authority attributes 926 (identity data such as a hostname, or an organization, or an individual), issuer attributes (whether the certificate is signed by a master CA or self-signed) time validity attributes 966 (date and times of certificate issuance and expiration), and encryption attributes 986 (public key, key agreement protocol, et cetera). A TLS chain may have additional CAs compared to the example illustrated in FIG. 9.

Message Flow

Figure 10:
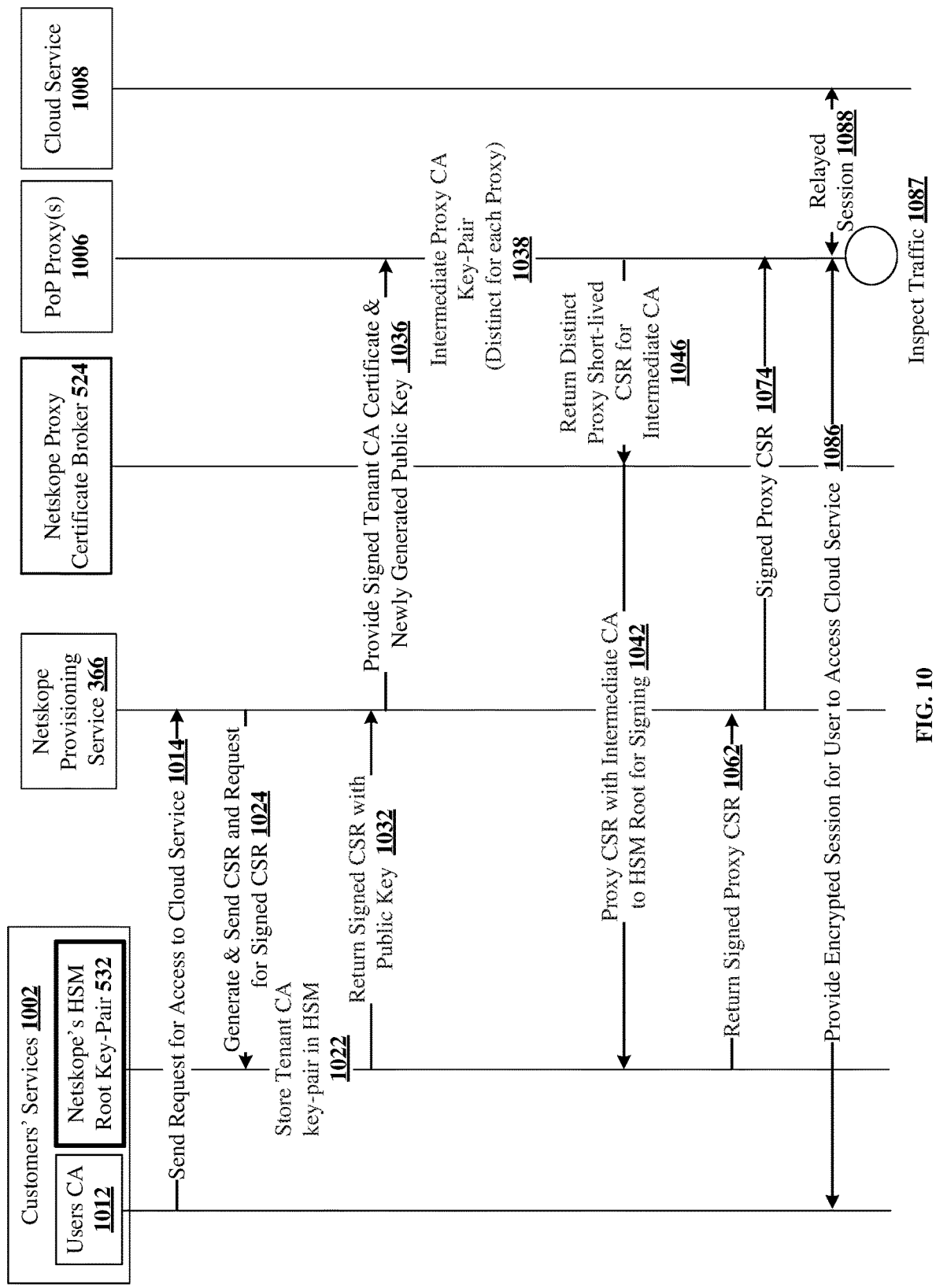
FIG. 10 illustrates a message flow diagram for operating an inspection proxy for encrypted sessions between users and cloud-based services, in accordance with an implementation of the technology disclosed.

FIG. 10 illustrates a message flow diagram for operating an inspection proxy for encrypted sessions between users and cloud-based services, in accordance with an implementation of the technology disclosed. The system comprises customer services 1002 (user's CA 1012 and Netskope's HSM root key-pair 532), the Netskope provisioning 366, the Netskope proxy certificate broker 524, PoP proxy(s) 1006, and a cloud service 1008.

Continuing with the description of FIG. 10, the user's CA 1012 sends a request for access to cloud service 1014 to the Netskope provisioning service 366. In return, the Netskope provisioning service 366 generates and sends a CSR and a request for a signed CSR 1024 to the Netskope's HSM 532. In some implementations of the disclosed method, the HSM 532 storing the customer's root-key pair may be replaced with a separate customer HSM 732, in accordance with the implementation illustrated in FIG. 7. The Netskope's HSM 532 stores the intermediate CA key-pair 1022 and returns the public key along with the signed CSR 1032. Next, the Netskope provisioning service 366 provides the signed intermediate CA certificate and newly generated public key 1036 to the POP proxy(s) 1006. Each respective POP proxy 1006 comprises an intermediate proxy CA key-pair that is distinct for each proxy 1038. The POP proxy(s) 1006 return a respective distinct proxy short-lived CSR for the domain-specific CA 1046 to the Netskope proxy certificate broker 524. The Netskope proxy certificate broker 524 sends the proxy CSR with domain-specific CA to the HSM root key-pair 532 for signing. The signed proxy CSR is returned by the HSM 532 to the Netskope provisioning service 366, which routes the signed proxy CSR back to the POP proxy(s) 1006. Thus, an encrypted session is provided for the user to access the cloud service 1086 and a session is relayed 1088 between the POP proxy(s) 1006 and the cloud service 1008. The POP proxy(s) 1006 are responsible for inspecting traffic 1087.

Computer System

Figure 11:
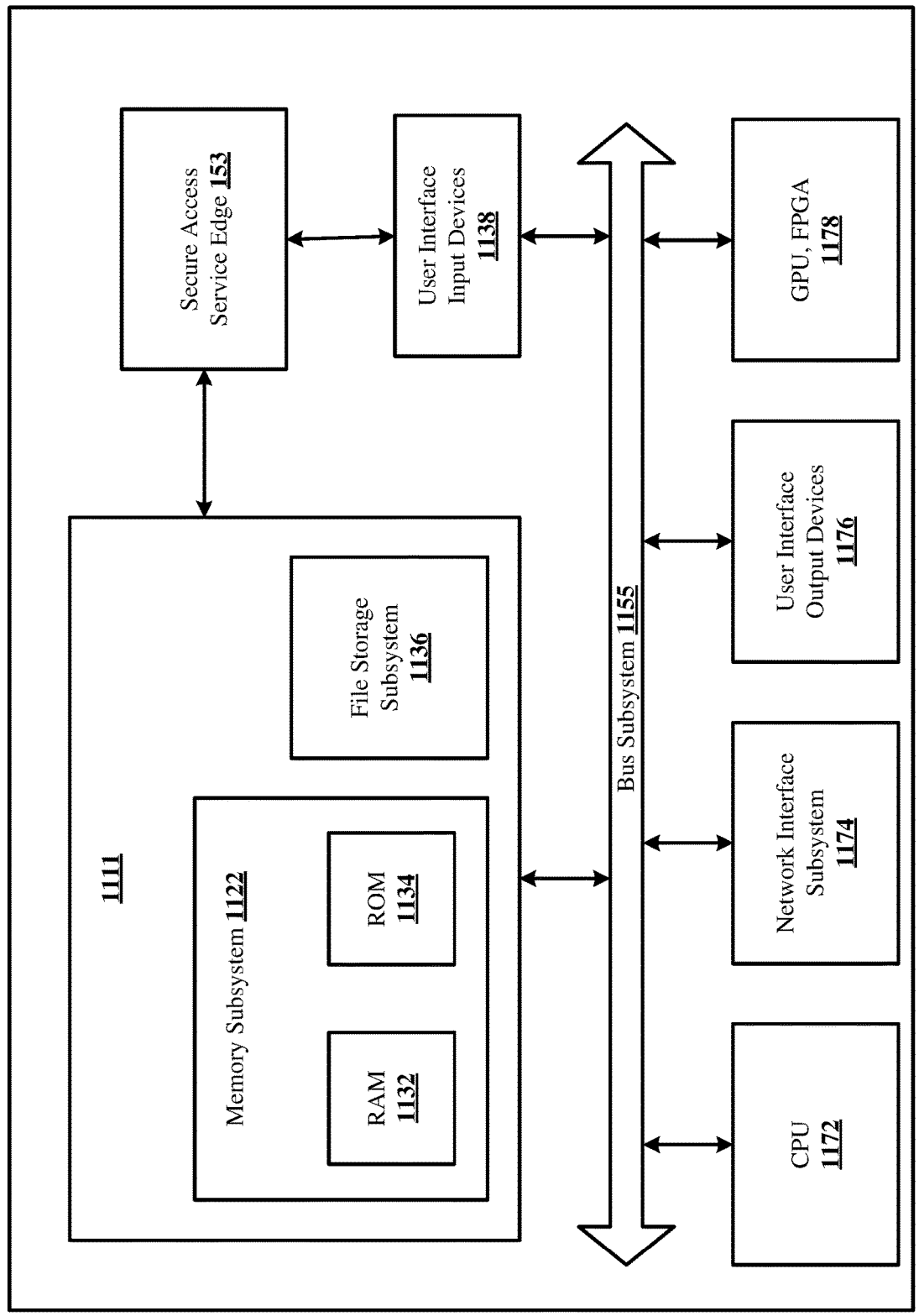
FIG. 11 is a simplified block diagram of a computer system that can be used for providing a proxy intermediate certificate authority, within accordance with an implementation of the disclosed technology.

FIG. 11 is a simplified block diagram of a computer system 1100 that can be used for providing a proxy intermediate certificate authority. System 1100 can also be used for generating certificates for use by a proxy interposed between cloud-based services and user systems. Computer system 1100 includes at least one central processing unit (CPU) 1172 that communicates with a number of peripheral devices via bus subsystem 1155 and secure access service edge (SASE) system 153 for providing network security services described herein. These peripheral devices can include a storage subsystem 1111 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one implementation, secure access service edge (SASE) system 153 of FIG. 1 is communicably linked to the storage subsystem 1111 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1111 stores programming and data constructs that provide the functionality of some or all of the modules and methods described herein. Subsystem 1178 can be graphics processing units (GPUs) or field-programmable gate arrays (FPGAs).

Memory subsystem 1122 used in the storage subsystem 1111 can include a number of memories including a main random-access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1111, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or less components than the computer system depicted in FIG. 11.

Particular Implementations

Some particular implementations and features for providing a proxy intermediate certificate authority that is domain-specific are described in the following discussion. This intermediate certificate authority belongs to a provider that is distinct from an organization whose users rely on it. The intermediate certificate authority can use an organization supplied root certificate or a provider supplied root certificate. A single layer or multi-layer intermediate certificate authority can be implemented, using either the organization or provider supplied root approach. These four alternative implementations are described below. They share many optional features which are not repeatedly restated for each implementation.

1 Organization Root Certificate, One Layer Described

Use of an intermediate CA proxy be described with a single layer of proxy. First, we describe a method chaining trust an organization's CA certificate. Then, a method in which the organization trusts the provider's root CA certificate and configures organization browsers accordingly. One disclosed method includes an entity, distinct from and not controlled by an organization, operating an inspection proxy for encrypted sessions, established by the inspection proxy, between users in an organization serviced by the inspection proxy and cloud-based services accessed by users. The method further includes providing an inspection proxy, comprising an intermediate domain-specific certificate authority that holds a certificate authority (CA) certificate that operation browsers, operated by users in the organization, recognize to be authorized to sign end-entity certificates by virtue of being chained to a root certificate recognized by the browsers. In certain implementations, the root certificate is associated with an organization CA. In other implementations, the root certificate is associated with an entity operating an inspection proxy in which the entity is distinct from and not controlled by the organization (e.g., the Netskope provisioning service).

Many implementations of the disclosed method comprise the inspection proxy receiving a public key and organization certificate from the organization CA. As a result, a chain of trust is established between the inspection proxy and the organization CA. The inspection proxy then initializes an intermediate CA certificate by generating an intermediate public-private key pair, sending an unsigned intermediate CA certificate to the organization CA via sending a certificate signing request, and receiving in response a signed intermediate CA certificate that has been chained to the organization CA's root certificate. Next, the inspection proxy receives a request from an organization browser (or browser, or user) to establish a session accessing a cloud-based resource at a particular domain, wherein the inspection proxy does not already have a domain-specific certificate that is trusted by the organization browsers for the domain. The inspection proxy generates a domain-specific certificate for the domain, including signing the domain-specific certificate using the intermediate key and chaining the domain-specific certificate to the organization CA certificate. As a result, the inspection proxy is now able to pose as the domain using the domain-specific certificate during the session with the organization browser and relay traffic between the organization browser and the domain, including decrypting session traffic received from the organization browser and encrypting session traffic sent to the organization browser. At least some session traffic relayed during the session is inspected by the inspection proxy, applying rules supplied by the organization to the distinct entity.

The methods described in this and following sections can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

The domain-specific certificate can have a configurable validity time to live, wherein the validity time is short such as three days or seven days. After the short validity time, or in the event that a breach is detected, the certificate expires and is revoked to maintain secure access.

The organization browser can receive the domain-specific certificate, recognize that it is signed and chained to the organization CA certificate, trust the domain-specific certificate, and establish the session with the inspection proxy that is posing as the domain.

The intermediate private key can be held in proxy memory of the inspection proxy, not on disk memory.

Some implementations of the disclosed method include the intermediate private key being used by a single instance of the inspection proxy and not shared with other instances of inspection proxies; this can be extended in other implementations to the intermediate private key not being shared with the master CA, either.

This method and the following methods and each optional feature also can be practiced as an article of manufacture or a system. The article of manufacture is a non-transitory computer readable medium holding computer instructions that, when executed on hardware, cause the hardware to perform or execute actions of any of the methods. A related implementation that is entertained in some jurisdictions is to a computer program that performs actions of any of the methods. A system includes hardware coupled to memory holding computer instructions that, when executed on hardware, cause the hardware to perform or execute actions of any of the methods. The individual methods and method steps are not repeated for these articles of manufacture and systems, for the sake of brevity. The extension of the methods into articles of manufacture and systems is illustrated in the claims that follow.

21 Provider Root Certificate, One Layer Described

Some implementations of the disclosed method further include the inspection proxy domain-specific certificate authority being authorized to sign subordinate certificates by an intermediate certificate authority.

In many implementations, an entity distinct from and not controlled by the organization operates an inspection proxy for encrypted sessions, established via the inspection proxy, between organization browsers and cloud-based resources, wherein the organization browsers are used by users in the organization and are configured to trust an entity CA certificate. Although the certificate chain in these implementations is rooted to the entity CA certificate in place of the organization CA certificate, the method follows a similar process.

The method further comprises the inspection proxy receiving a public key and organization certificate from the organization CA. As a result, a chain of trust is established between the inspection proxy and the organization CA. The inspection proxy then initializes an intermediate CA certificate by generating an intermediate public-private key pair, sending an unsigned intermediate CA certificate to the organization CA via sending a certificate signing request, and receiving in response a signed intermediate CA certificate that has been chained to the organization CA's root certificate. Next, the inspection proxy receives a request from an organization browser (or browser, or user) to establish a session accessing a cloud-based resource at a particular domain, wherein the inspection proxy does not already have a domain-specific certificate that is trusted by the organization browsers for the domain. The inspection proxy generates a domain-specific certificate for the domain, including signing the domain-specific certificate using the intermediate key and chaining the domain-specific certificate to the organization CA certificate. As a result, the inspection proxy is now able to pose as the domain using the domain-specific certificate during the session with the organization browser and relay traffic between the organization browser and the domain, including decrypting session traffic received from the organization browser and encrypting session traffic sent to the organization browser. At least some session traffic relayed during the session is inspected by the inspection proxy, applying rules supplied by the organization to the distinct entity.

As above, the methods described in this and following sections can include one or more of the following features and/or features described in connection with additional methods disclosed. In the interest of conciseness, the combinations of features disclosed in this application are not individually enumerated and are not repeated with each base set of features.

The domain-specific certificate can have a configurable validity time to live, wherein the validity time is short such as three days or seven days. After the short validity time, or in the event that a breach is detected, the certificate expires and is revoked to maintain secure access.

The organization browser can receive the domain-specific certificate, recognize that it is signed and chained to the organization CA certificate, trust the domain-specific certificate, and establish the session with the inspection proxy that is posing as the domain.

The intermediate private key can be held in proxy memory of the inspection proxy, not on disk memory.

Some implementations of the disclosed method include the intermediate private key being used by a single instance of the inspection proxy and not shared with other instances of inspection proxies; this can be extended in other implementations to the intermediate private key not being shared with the master CA, either.

In one implementation, the method further includes the organization browser receiving the domain-specific certificate, recognizing that it is signed and chained to the entity CA certificate, trusting the domain-specific certificate, and establishing the session with the inspection proxy that is posing as the domain.

1 Organization Root, Multi-Layer

A multi-layer approach to the intermediate CA proxy can reduce strain on a root CA authority, regardless of whether the root is operated by the organization or proxy provider. For instance, there may be 500 proxy instances worldwide to server a major multi-national organization. Requests from all 500 proxy instances to an organization's own CA authority could well over-tax the organization CA authority, so the proxy provider builds a chain of trust hierarchically, with an extra link in the chain, so only one or a relatively small number of top-level provider CA authorities need to be chained to the organization CA authority.

First, we describe a method chaining trust an organization's CA certificate. Then, a method in which the organization trusts the provider's root CA certificate and configures organization browsers accordingly. In some implementations of the disclosed multi-layer method, numerous instances of an inspection proxy for encrypted sessions are initialized, such that the sessions are established via at least 100 instances and no more than 1,000,000 instances of the inspection proxy and the sessions connect organization browsers to cloud-based resources. The organization browsers are used by users in an organization that has an organization CA certificate. An entity, distinct and not controlled by the organization, provides at least one master CA (e.g., a Netskope master CA with a longer validity time signed by the organization CA) and the numerous instances of the inspection proxy. For each respective inspection proxy, a respective intermediate CA certificate is initialized by generating an intermediate public-private key pair, sending an unsigned intermediate CA certificate to the organization CA in sending a certificate signing request, and receiving in response a signed intermediate CA certificate that has been chained to the organization CA certificate.

Next, each respective inspection proxy generates a respective domain-specific certificate for a domain, including signing each respective domain-specific certificate using the respective intermediate private key and chaining the respective-specific certificate to the organization CA certificate. The respective inspection proxy is now enabled to pose as the particular domain using the respective domain-specific certificate during a session with the organization browser and relay traffic between the organization browser and the particular domain. The relaying of traffic may include at least one of decrypting session traffic received from the organization browser and encrypting session traffic sent to the organization browser. At least some of the session traffic that is relayed during the session is inspected by the respective inspection proxy, applying rules supplied by the organization to the distinct entity.

In one implementation of the disclosed method, the master CA certificate, upon signing by the organization CA, has a first time to live that is at least ten times as long as a second time to live of a respective intermediate CA certificate, upon signing by the CA. In another implementation, the master CA certificate, upon signing by the organization CA, has a first time to live that is at least four times as long as a second time to live of a respective intermediate CA certificate, upon signing by the CA. In yet another implementation, the master CA certificate, upon signing by the organization CA, has a first time to live that is between one week and one year, and each respective intermediate CA certificate, upon signing by the organization CA, has a second time to live that does not exceed expiration of the organization CA certificate and does not exceed one month.

One implementation of the disclosed method further comprises a respective organization browser receiving the respective domain-specific certificate, recognizing that it is signed and chained to the organization CA certificate, trusting the respective domain-specific certificate, and establishing the session with the respective inspection proxy that is posing as the domain.

19 Provider ROOT, Multi-Layer

In certain implementations, an entity distinct from and not controlled by an organization, operates an inspection proxy for encrypted sessions such that the inspection proxy is one among 100 instances and less than 1,000,000 instances of inspection proxies. The organization browsers are used by users in an organization that has an organization CA certificate. An entity, distinct and not controlled by the organization, provides at least one master CA (e.g., a Netskope master CA with a longer validity time signed by the organization CA) and the numerous instances of the inspection proxy. For the inspection proxy, an intermediate CA certificate is initialized by generating an intermediate public-private key pair, sending an unsigned intermediate CA certificate to the organization CA in sending a certificate signing request, and receiving in response a signed intermediate CA certificate that has been chained to the organization CA certificate.

Next, the inspection proxy generates a domain-specific certificate for a domain, including signing the domain-specific certificate using the intermediate private key and chaining the respective domain-specific certificate to the organization CA certificate. The inspection proxy is now enabled to pose as the particular domain using the respective domain-specific certificate during a session with the organization browser and relay traffic between the organization browser and the particular domain. The relaying of traffic may include at least one of decrypting session traffic received from the organization browser and encrypting session traffic sent to the organization browser. At least some of the session traffic that is relayed during the session is inspected by the inspection proxy, applying rules supplied by the organization to the distinct entity.

Some implementations of the disclosed method further include a customer HSM or a security broker HSM that holds a private key used by the certificate signing authority.

In one disclosed implementation, the method described in this section further includes the inspection proxy intercepting traffic between the users and a cloud-based service.

Some implementations of the disclosed method further include the inspection proxy sending the inspection proxy intermediate certificate authority a certificate request for a site-specific signed certificate to allow the inspection proxy to pose as responding from a cloud-based service's URL. In this implementation, the disclosed method further includes the inspection proxy receiving from the inspection proxy intermediate certificate authority the signed site-specific certificate that allows the inspection proxy to pose as responding to the user from the cloud-based service's URL.

Other implementations of the methods described in the preceding sections can include a tangible non-transitory computer-readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of an entity that is distinct from and not controlled by a customer organization, operating a cloud-based inspection proxy for encrypted sessions established via the cloud-based inspection proxy, between customer organization browsers or clients (collectively customer organization browsers) and cloud-based resources, wherein the customer organization browsers are deployed to users in the customer organization and the customer organization has a customer organization certificate authority (CA), the computer-implemented method comprising the cloud-based inspection proxy:

receiving from the customer organization CA a public key and an organization certificate for establishing a chain of trust between the cloud-based inspection proxy to the customer organization CA, wherein the customer organization has stored the organization certificate into certificate stores of the customer organization browsers;

initializing an intermediate CA certificate by generating an intermediate public-private key pair, sending an unsigned intermediate CA certificate to the customer organization CA in a certificate signing request ("CSR"), and receiving from the customer organization CA a signed intermediate CA certificate that has been signed by the customer organization CA using a private key held in an HSM by the customer organization and thereby chained to the organization certificate;

receiving a request from a customer organization browser to establish a session accessing a cloud-based resource at a domain, wherein the cloud-based inspection proxy does not already have a domain-specific certificate for the domain that is trusted by the customer organization browsers;

generating a signed domain-specific short-lived certificate by signing the domain-specific certificate using an intermediate private key from the intermediate public-private key pair and thereby chaining the signed domain-specific short-lived certificate to the organization certificate;

posing as the domain using the signed domain-specific short-lived certificate during the session with the customer organization browser, relying on the customer organization browser to trust the signed domain-specific short lived certificate based on it being chained to the organization certificate;

relaying traffic between the customer organization browser and the domain, including decrypting and reencrypting session traffic between the customer organization browser and the domain; and inspecting at least some session traffic relayed during the session by applying rules supplied by the customer organization to the entity.

2. The computer-implemented method of claim 1, further including setting a time to live of the domain-specific certificate to 3 days or less.

3. The computer-implemented method of claim 1, further including setting a time to live of the domain-specific certificate to one week or less.

4. The computer-implemented method of claim 1, further including setting a time to live of the signed intermediate CA certificate to one week or less.

5. The computer-implemented method of claim 1, further including setting a time to live of the signed intermediate CA certificate to one month or less.

6. The computer-implemented method of claim 1, further including:
the customer organization browser receiving the domain-specific certificate, recognizing that it is signed and chained to the organization certificate, trusting the domain-specific certificate, and establishing the session with the cloud-based inspection proxy that is posing as the domain.

7. The computer-implemented method of claim 1, wherein the intermediate private key is held in proxy memory of the cloud-based inspection proxy, not on disk memory.

8. The computer-implemented method of claim 1, wherein the intermediate private key is used by a single instance of the cloud-based inspection proxy, not shared with other instances of cloud-based inspection proxies.

9. The computer-implemented method of claim 7, wherein the intermediate private key is used by a single instance of the cloud-based inspection proxy, not shared with other instances of cloud-based inspection proxies.

10. A non-transitory computer readable medium holding computer instructions that, when executed on hardware possessed by an entity distinct from and not controlled by a customer organization, implement operating a cloud-based inspection proxy for encrypted sessions established via the cloud-based inspection proxy, between customer organization browsers or clients (collectively customer organization browsers) and cloud-based resources, wherein the customer organization browsers are deployed to users in the customer organization and the customer organization has an customer organization certificate authority (CA), and implement actions including:
receiving from the customer organization CA a public key and an organization certificate for establishing a chain of trust between the cloud-based inspection proxy to the customer organization CA, wherein the customer organization has stored the organization certificate into certificate stores of the customer organization browsers;
initializing an intermediate CA certificate by generating an intermediate public-private key pair, sending an unsigned intermediate CA certificate to the customer organization CA in a certificate signing request ("CSR"), and receiving from the customer organization CA a signed intermediate CA certificate that has been signed by the customer organization CA using a private key held in an HSM by the customer organization and thereby chained to the organization certificate;

receiving a request from a customer organization browser to establish a session accessing a cloud-based resource at a domain, wherein the cloud-based inspection proxy does not already have a domain-specific certificate for the domain that is trusted by the customer organization browsers;
generating a signed domain-specific short-lived certificate by signing the domain-specific certificate using an intermediate private key from the intermediate public-private key pair and thereby chaining the signed domain-specific short-lived certificate to the organization certificate;
posing as the domain using the signed domain-specific short-lived certificate during the session with the customer organization browser, relying on the customer organization browser to trust the signed domain-specific short lived certificate based on it being chained to the organization certificate;
relaying traffic between the customer organization browser and the domain, including decrypting and reencrypting session traffic between the customer organization browser and the domain; and
inspecting at least some session traffic relayed during the session by applying rules supplied by the customer organization to the entity.

11. The non-transitory computer readable medium of claim 10, further including instructions implementing the action of setting a time to live of the domain-specific certificate to 3 days or less.

12. The non-transitory computer readable medium of claim 10, further including instructions implementing the action of setting a time to live of the domain-specific certificate to one week or less.

13. The non-transitory computer readable medium of claim 10, further including instructions implementing the action of setting a time to live of the signed intermediate CA certificate to one week or less.

14. The non-transitory computer readable medium of claim 10, further including instructions implementing the action of setting a time to live of the signed intermediate CA certificate to one month or less.

15. The non-transitory computer readable medium of claim 10, further including instructions implementing the action of:
the customer organization browser receiving the domain-specific certificate, recognizing that it is signed and chained to the organization CA certificate, trusting the domain-specific certificate, and establishing the session with the cloud-based inspection proxy that is posing as the domain.

16. The non-transitory computer readable medium of claim 10, wherein the intermediate private key is held in proxy memory of the cloud-based inspection proxy, not on disk memory.

17. The non-transitory computer readable medium of claim 10, wherein the intermediate private key is used by a single instance of the cloud-based inspection proxy, not shared with other instances of inspection proxies.

18. The non-transitory computer readable medium of claim 16, wherein the intermediate private key is used by a single instance of the cloud-based inspection proxy, not shared with other instances of inspection proxies.

19. A system including processor hardware coupled to a non-transitory computer readable medium holding computer instructions that, when executed on hardware possessed by an entity distinct from and not controlled by a customer organization, implement operating a cloud-based inspection proxy for encrypted sessions established via the cloud-based inspection proxy, between customer organization browsers or clients (collectively customer organization browsers) and cloud-based resources, wherein the customer organization browsers are deployed to users in the customer organization and the customer organization has an customer organization certificate authority (CA), and implement actions including:

receiving from the customer organization CA a public key and an organization certificate for establishing a chain of trust between the cloud-based inspection proxy to the customer organization CA, wherein the customer organization has stored the organization certificate into certificate stores of the customer organization browsers;

initializing an intermediate CA certificate by generating an intermediate public-private key pair, sending an unsigned intermediate CA certificate to the customer organization CA in a certificate signing request ("CSR"), and receiving from the customer organization CA a signed intermediate CA certificate that has been signed by the customer organization CA using a private key held in an HSM by the customer organization and thereby chained to the organization certificate;

receiving a request from a customer organization browser to establish a session accessing a cloud-based resource at a domain, wherein the cloud-based inspection proxy does not already have a domain-specific certificate for the domain that is trusted by the customer organization browsers;

generating a signed domain-specific short-lived certificate by signing the domain-specific certificate using an intermediate private key from the intermediate public-private key pair and thereby chaining the signed domain-specific short-lived certificate to the organization certificate;

posing as the domain using the signed domain-specific short-lived certificate during the session with the customer organization browser, relying on the customer organization browser to trust the signed domain-specific short lived certificate based on it being chained to the organization certificate;

relaying traffic between the customer organization browser and the domain, including decrypting and reencrypting session traffic between the customer organization browser and the domain; and inspecting at least some session traffic relayed during the session by applying rules supplied by the customer organization to the entity.

20. The system of claim 19, further including computer instructions implementing the action of setting a time to live of the domain-specific certificate to 3 days or less.

* * * * *